Nov. 25, 1969 — R. MAIGROT — 3,480,121

PRESS BRAKE AND EXHAUST VALVE THEREFOR

Filed July 6, 1967 — 2 Sheets-Sheet 1

INVENTOR.
ROBERT MAIGROT
BY
Meyer, Tilberry & Body
ATTORNEYS

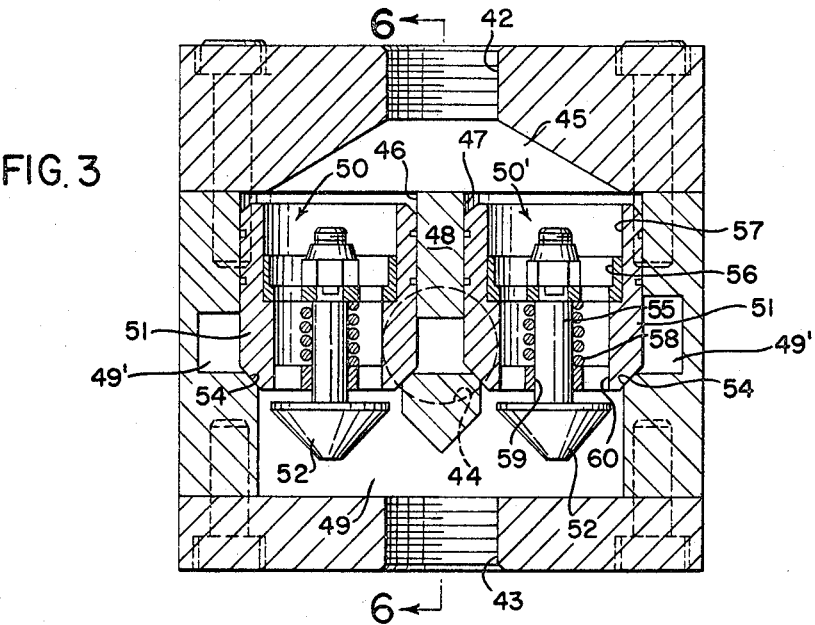
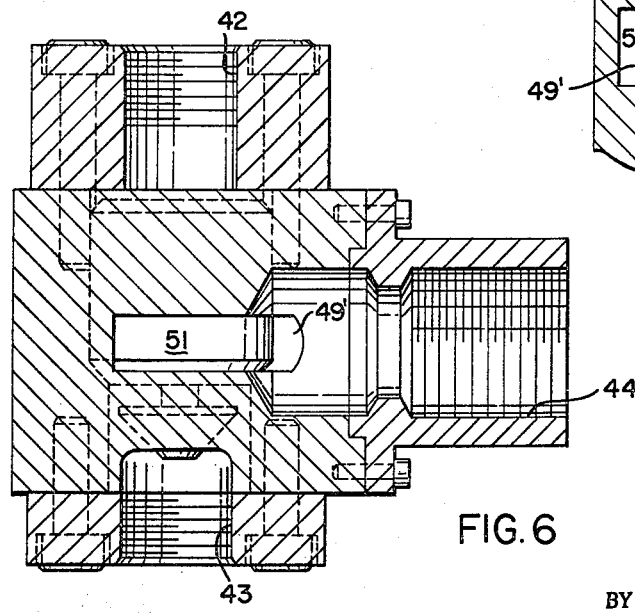

United States Patent Office 3,480,121
Patented Nov. 25, 1969

3,480,121
PRESS BRAKE AND EXHAUST VALVE THEREFOR
Robert Maigrot, Paris, France, assignor to E. W. Bliss Company, a corporation of Delaware
Filed July 6, 1967, Ser. No. 651,412
Int. Cl. F16d 67/00; B30b 1/32; G05d 7/01
U.S. Cl. 192—18
4 Claims

ABSTRACT OF THE DISCLOSURE

The disclosure relates to the art of pneumatic press brake and clutch controls employing a standard control valve to exhaust the fluid operating cylinder of the brake and clutch unit. The arrangement applies particularly to heavy duty crank driven presses in which the ram is started and stopped by a friction disc brake and clutch unit coupled to the crankshaft. The brake is maintained in a disengaged position by the air pressure and the clutch is engaged during a greater part of one revolution of the crank. To assure that the crankshaft is stopped and started from a predetermined point, the disclosure provides a separate fluid responsive exhaust valve which is actuated by the control valve. The brake is engaged by allowing air to escape from the fluid cylinder through the exhaust valve at a controlled rate instead of through the control valve. Any tendency to increase the crank stopping angle due to a malfunction of the air control valve is thus eliminated since it is bypassed during the exhaust cycle. Furthermore, the exhaust valve employs dual flow paths each controlled by separate valving means redundant to the system such that should one become jammed the other has enough flow area to allow for normal braking travel.

---

For illustrative purposes, the following discussion will be directed to the application of a preferred embodiment of a pneumatic brake and clutch control as applied to a mechanical crank driven press, it being understood, however, that the invention is not intended to be limited to such a specific application, but is also suitable for use in other types of machines, hydraulically or pneumatically operated, where a control valve is employed to regulate the escape of fluid pressure from a fluid operating cylinder of the machine.

The length of time a press is under loaded conditions will be short. Even though the tonnage rating of a press may be of small value, the rate at which the tonnage load comes on a press will be in the neighborhood of several thousands tons per second, depending on the operating speed. Ordinarily, the crankshaft which drives the ram of the press is started and stopped, or jogged, by a friction disc brake and clutch unit housed in the flywheel on the end of the crankshaft. Usually, a two-way, solenoid operated, air control valve will be employed to connect the fluid operating cylinder of the brake and clutch unit to air pressure for disengaging the brake and engaging the clutch at the start of press operation; and, alternatively, to exhaust the cylinder for application of the brake and release of the clutch to stop the press.

Due to the high rate at which the tonnage load comes on the press, it is necessary to rapidly transfer the air from the fluid cylinder in a controlled fashion so that the brake linings will engage at the proper time during the cycle to assure that the crankshaft stops after a complete revolution at the desired position, usually top dead center.

Heretofore, due to the fact that the air was exhausted through a solenoid operated control valve, a change in the characteristics of this valve had a detrimental effect on the press stopping angle. For example, a malfunction of the control valve during the exhaust cycle would retard brake application resulting in an increase in the press stopping angle.

This problem and others are overcome with the present invention which provides a separate exhaust valve bypassing the standard solenoid operated valve during the exhaust cycle to insure that braking travel will be unchanged.

In accordance with the invention, a fluid control is provided for a press having a crankshaft, a friction brake coupled to the crankshaft, and a brake cylinder for actuating the brake to the disengaged position when connected to a source of air pressure and to the engaged position when exhausted. The control comprises a cycle initiating valve situated between the pressure source and brake cylinder which is operable to connect the latter to fluid pressure disengaging the brake in response to the rotational position of the crankshaft. A separate exhaust valve is positioned between the cycle initiating valve and the brake cylinder having a valve element which is responsive to equilibrium pressures on opposite sides thereof to close and maintain the prevailing fluid pressure in the brake cylinder during press operation, said valve element also being responsive to a drop in line pressure upstream thereof to exhaust the brake cylinder for engaging the brake in a controlled manner stopping the press.

Further in accordance with the invention, the exhaust valve provides a three way flow passage controlled by two separate valve elements. One element is a sleeve member reciprocated in an exhaust port. The other is a poppet coaxially movable relative to the sleeve member which allows air coming into the valve to flow into the brake cylinder. The poppet is spring biased to close the flow passage when equilibrium conditions exist and the sleeve member is responsive to a differential fluid pressure to uncover the exhaust port and rapidly transfer fluid from the brake cylinder for a smooth braking action.

Further in accordance with the invention, dual passage flow areas are provided, each controlled by separate sleeve and poppet units so that should one unit become jammed the other has enough flow area to allow for normal braking operation.

The principal object of the invention is to provide a brake control having, in series with a conventional solenoid operated valve, a separate exhaust valve operable in response to fluid pressure to insure that braking travel remains unchanged should the solenoid operated valve become inoperative.

Another object is to provide a fluid responsive exhaust valve having dual valve elements providing a redundant valving action should one of the valve elements become jammed.

It is a further object to provide a control in accordance with the preceding objects wherein press operation is initiated through means which maintain the brake cylinder under pressure and the brake is disengaged.

Other objects and advantages relating to efficiency, safety, and flexibility will appear from the following description and appended drawings wherein:

FIGURE 3 is a transverse sectional view through the exhaust valve showing the dual flow passages and valving elements thereof in the condition of pressurizing the fluid cylinder to disengage the brake and engage the clutch;

FIGURE 5 is a fragmentary view similar to FIGURE 4 showing the condition of the valve elements during the brake engaging and clutch disengaging cycle; and FIGURE 6 is a sectional view of the exhaust valve taken along line 6—6 of FIGURE 3.

Figure 1:
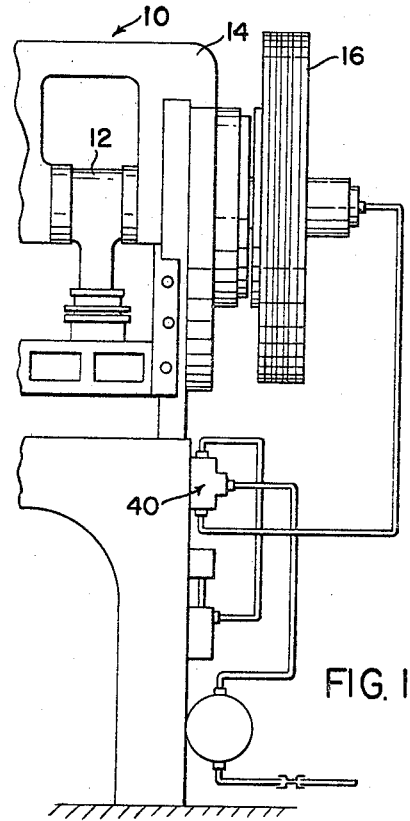
FIGURE 1 is a partial front view of a crank driven press incorporating a fluid control in accordance with the invention.
Figure 2:
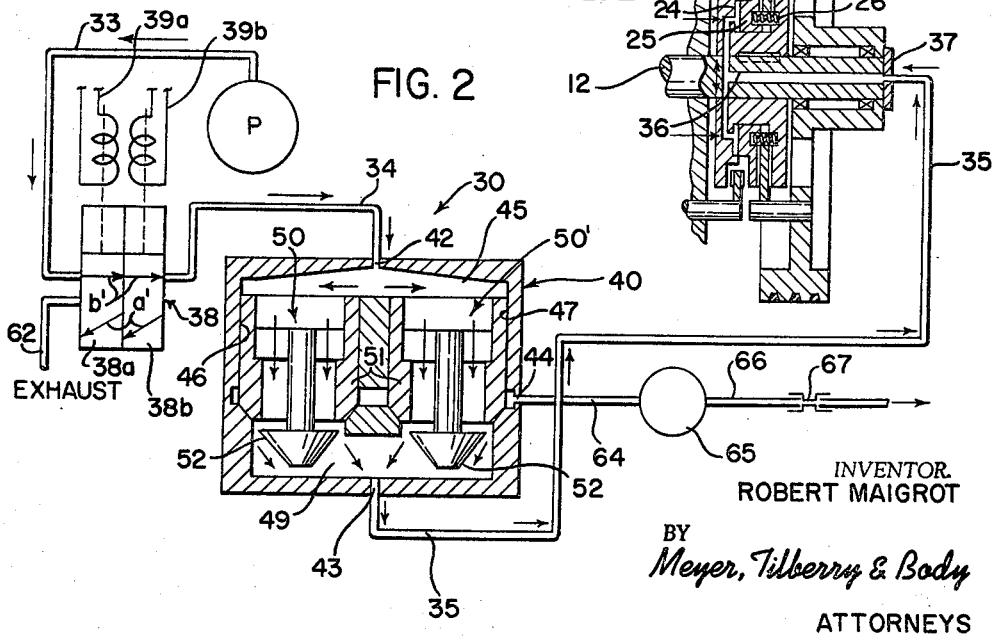
FIGURE 2 is a schematic piping diagram showing the relationship of the cycle initiating valve and exhaust valve to the friction brake and clutch unit of the press in FIGURE 1.

Referring now to the drawings wherein the showings are for the purpose of illustrating a preferred embodiment of the invention and not for the purpose of limiting the same, in FIGURE 1 a crank driven press 10 has a crankshaft 12 journaled in a frame 14. A flywheel 16 is mounted on the outboard end thereof. Referring to FIGURE 2, the flywheel 16 houses a combination brake and clutch unit 18 including a friction brake 20, a clutch plate 22, a fluid cylinder 24 having a movable piston 25, and a plurality of springs 26 pressing the piston 25 in opposition to the fluid pressure delivered to the cylinder 24 by the fluid control generally indicated at 30. It will be understood that the brake and clutch unit 18 is of the type in which the brake 20 is normally disengaged and the clutch 22 engaged when the cylinder 24 is pressurized thus compressing the springs 26, while conversely the clutch 22 is disengaged and the brake 20 engaged when the cylinder 24 is exhausted affording opportunity for the springs 26 to press the brake 20 against the plate 28 which is keyed to the crankshaft 12.

In accordance with the invention, the brake 20 is actuated by the fluid control 30 which includes a source of pressure P delivered to the cylinder 24 through lines 33, 34, 35 and 36 by means of a rotating coupling 37 on the end of the crankshaft 12. A solenoid operated, air control valve 38 having redundant valve components 38A, 38B, is connected in lines 33, 34, in series with exhaust valve 40. The two valve components 38A, 38B, either of which is referred to hereinafter as a cycle initiating valve, are operated in unison by solenoids 39A, 39B, each of which is controlled in a known manner such as by limit switches (not shown) which are set to operate at a predetermined point during the rotation of the crank to alternately engage and disengage the brake and clutch.

Let it be assumed that when the solenoids 39A, 39B are deenergized both cycle initiating valves 38A, 38B are open, as represented by the diagonal arrows $a'$, to exhaust line 34 to line 62 initiating the first stage of brake engagement while simultaneously closing line 33. Conversely, when solenoids 39A, 39B are energized, the exhaust ports of valves 38A, 38B are closed and lines 33, 34 are connected to the fluid cylinder 24, as represented by the horizontal arrows $b'$, disengaging the brake 20 and engaging the clutch 22.

In most modern presses the solenoid operated valve 38 is connected directly to line 36 through the rotating coupling 37 and thus the brake travel is subject directly to any variations in the characteristics of the electrically operated valve. In accordance with the invention, a fluid responsive exhaust valve 40 is connected in series between the cylinder 24 and the cycle initiating valves 38A, 38B to insure that the braking travel remains unchanged regardless of the condition of these valves.

Referring now to FIGURE 3, the preferred embodiment of the exhaust valve 40 comprises a housing having an inlet 42, outlet 43 and exhaust port 44. The housing 41 has an interior chamber 45 divided into two cylindrical passages 46, 47 by a partition 48 each of which open at the opposite ends into a chamber 49. Each passage 46, 47 receives identical valve elements 50, 50', each of which comprises a sleeve 51 and a poppet 52 coaxially movable relative thereto. Each sleeve 51 is slidably sealed within the passages 46, 47 and has an annular seat thereon adapted to engage an annular seat 54 in the passages 46, 47. Each poppet 52 includes a stem 55 having a cylindrical guide sleeve 56 mounted thereon which reciprocates in an enlarged diameter counterbore 57 within the upper portion of each sleeve 51. The stem 55 is slidable in a central aperture 59 in the end wall of the sleeve 51 which has ports 60 therein adapted to be covered by the poppet 52 completely closing the passage 46, 47 to the chamber 49. A coil spring 58 surrounding the poppet stem 55 biases it toward the closed position of ports 60. Exhaust port 44 and chamber 49 are adapted to be connected via passages 46, 47 and exhaust chamber 49' when either sleeve 51 is lifted off its seat 54 as will be described hereinafter.

Referring once again to FIGURE 2, in conjunction with FIGURE 3, line 34 is connected from the solenoid operated valve 38 to the port 42 of exhaust valve 40 and line 35 to the port 43. An exhaust line 64 is connected to exhaust port 44 which transfers air pressure from the chamber 49 to a surge tank 65 and thence to a line 66 having a restriction 67 therein for controlling the rate of discharge.

OPERATION

Assuming the crankshaft 12 was stopped at top dead center and that it is desirable after each 360° revolution thereof that it be stopped at the same position, the press is put in operation by disengaging the brake 20 and engaging the clutch 22 which is accomplished by energizing solenoids 39A, 39B of valve 38. Thus, fluid pressure from source P flows through lines 33, 34 and into chamber 45 of the exhaust valve 40 (FIGURE 2). From there the fluid is divided and flows in substantially equal proportions through passages 46, 47. Inasmuch as the fluid cylinder 24 and thus chamber 49 of the exhaust valve 40 are at lower pressure than chamber 45, the poppets 52 of both valve elements 50, 50' will open while the sleeves 51 will remain seated closing off exhaust port 44. This is the condition of the valve 40 as shown in FIGURE 3.

Figure 4:
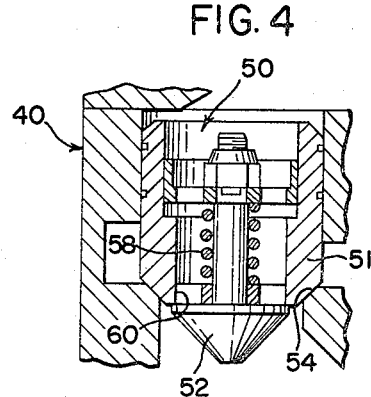
FIGURE 4 is a fragmentary view of one of the valve elements of the exhaust valve showing the condition at equilibrium when the fluid cylinder has reached line pressure and the brake is fully disengaged.

Referring now to FIGURE 4 a fragmentary view of valve 40 is shown to illustrate the position of both valve elements 50, 50' during operation of the press although only one element is shown. The air pressure builds up in the brake chamber 24 until it equals the pressure in chamber 45. At equilibrium the poppets 52 will close covering the ports 60 in response to the force of springs 58. The brake 20 is now fully disengaged and the clutch 22 fully engaged as maximum driving torque is being applied to the crankshaft 12.

At a predetermined angle of crankshaft rotation, solenoids 39A, 39B are de-energized closing line 33 and opening line 34 to exhaust line 62 of valve 38, thus initiating the first stage of brake engagement. Air in the fluid cylinder 24 is rapidly transferred to the surge tank 63 through the exhaust valve 40 (FIGURE 5), until the brake 20 is in light contact with the plate 28. During this first stage of brake application chamber 45, which is now connected to exhaust through line 62, is at a lower pressure than chamber 49 which is connected to the fluid cylinder 24. This results in a pressure differential in a direction tending to unseat the sleeves 51 while holding poppets 52 closed. The sleeves 51 are lifted off their seats 54 simultaneously connecting chamber 49 to chamber 49' and the exhaust port 44. Each poppet 52, however, remains closed covering ports 60 to prevent discharge through passages 46, 47 into chamber 45 which is now in communication with the exhaust line 62 of valve 38.

During the first stage of brake application the drop of pressure in the fluid chamber 24 is rapid until the surge tank 65 is filled. Thereafter, during the second stage the calibrated restriction 67 in line 66 gives a smooth, gradual braking action effective for stopping the crank.

In accordance with the invention, should one of the cycle initiating valves 38A, 38B become inoperative or change its flow characteristics for some reason, the braking travel will remain unchanged since air is not exhausted through the valve 38, but instead through a separate exhaust valve 40. Moreover, should one of the exhaust passages 46, 47 become jammed or either of the valve elements 50, 50' inoperative, the other has enough flow area to allow a normal braking cycle, i.e., for stopping the crank at top dead center.

What is claimed is:

1. A fluid control for a crank driven press having a crankshaft, a friction brake coupled thereto adapted to be alternately engaged and disengaged in response to fluid pressure, and a fluid operating cylinder connected to a source of fluid pressure when the brake is disengaged, said control including:
- a cycle initiating valve means operable in response to crankshaft rotation to connect said fluid pressure source to said fluid operable cylinder in one position and alternatively, operable to cause the exhaust of the cylinder in a second position,
- an exhaust control valve means between said cylinder and cycle initiating valve means responsive to the exhaust position of said latter valve means to control the release of fluid being transferred from the fluid operable cylinder, said exhaust control valve means having a separate exhaust means bypassing the cycle initiating valve in said second position; and,
- a surge tank connected to said separate exhaust means in the second position of said cycle initiating valve means,
- a discharge line from the surge tank, and
- a flow restriction in the discharge line to regulate the rate of escape of fluid from said fluid cylinder, rapidly at first to bring about initiation of brake application and thereafter more slowly due to said restriction providing overall a quick response but smooth braking action.

2. A fluid control for a crank driven press having a crankshaft, a friction brake coupled thereto adapted to be alternately engaged and disengaged in response to fluid pressure, and a fluid operating cylinder connected to a source of fluid pressure when the brake is disengaged, said control including:
- a cycle initiating valve means operable in response to crankshaft rotation to connect said fluid pressure source to said fluid operable cylinder in one position and alternatively, operable to cause the exhaust of the cylinder in a second position,
- an exhaust control valve means between said cylinder and cycle initiating valve means responsive to the exhaust position of said latter valve means to control the release of fluid being transferred from the fluid operable cylinder, said exhaust control valve means having a separate exhaust means bypassing the cycle initiating valve in said second position; and,
- a housing defining first, second, and exhaust chambers, each connected by a passageway,
- a valve seat in the passageway,
- a movable sleeve means sealably received in the passageway and adapted to seat therein when said brake is disengaged disconnecting said exhaust chamber from the other two,
- orifice means in the sleeve connecting the first and second chambers and
- valve means carried by the sleeve responsive to equilibrium conditions for closing said orifice means, said sleeve being responsive to differential pressure in said first and second chambers tending to unseat it connecting said exhaust chamber to said fluid cylinder.

3. A fluid control according to claim 2 wherein said first, second, and exhaust chambers are connected by a pair of passageways providing equal redundant flow areas each controlled by a separate valve means and movable sleeve which are both simultaneously responsive to fluid pressure.

4. A fluid control according to claim 2 in which said valve means comprises a poppet having a stem coaxially guided in said sleeve and
- a spring biasing said poppet toward the closed position which at equilibrium pressure between said first and second chambers causes said poppet to close said orifice means.

References Cited

UNITED STATES PATENTS

| 2,706,026 | 4/1955 | Georgeff | 192—12.1 |
| 2,734,609 | 2/1956 | Fritzsch | 192—18.1 X |
| 2,909,256 | 10/1959 | Chung. | |
| 2,911,080 | 11/1959 | Crane et al. | 192—18.1 X |
| 3,042,166 | 7/1962 | Crane | 192—18.1 X |

FOREIGN PATENTS 960,051      Great Britain.

BENJAMIN W. WYCHE III, Primary Examiner

U.S. Cl. X.R.

91—443; 100—269; 137—102; 188—170; 192—109